Jan. 16, 1962     C. H. SMOOT     3,017,556

ELECTRICAL SERVOSYSTEM CONTROL CIRCUIT

Filed March 18, 1957

INVENTOR:
Charles H. Smoot,
BY Bair, Freeman & Molinare
ATTORNEYS.

United States Patent Office 3,017,556
Patented Jan. 16, 1962

3,017,556
ELECTRICAL SERVOSYSTEM CONTROL CIRCUIT
Charles H. Smoot, Chicago, Ill., assignor to Republic Flow Meters Company, Chicago, Ill., a corporation of Illinois
Filed Mar. 18, 1957, Ser. No. 646,785
9 Claims. (Cl. 318—448)

This invention relates to electrical control circuits and more particularly to a circuit for producing control forces responsive to changes in a condition which may be utilized to return the condition to a desired set point.

In the control of various physical conditions involved in combustion, industrial processes and the like, the usual practice has been to produce varying control effects mechanically through regulators or controllers which have various anticipating or stabilizing factors built in. In many cases electrical circuits are used, such as telemetering or follow-up circuits to control the operation of correcting devices, such as valves, speed controllers and the like. However, the actual controlling and compensating forces have been produced mechanically through dashpots, resetting mechanisms and similar constructions. One example of a system of this type is disclosed and claimed in my Patent No. 2,644,642.

It is one of the objects of the present invention to provide an electric control circuit in which the actual controlling and compensating forces are developed electrically, thereby substantially simplifying the apparatus.

Another object is to provide a control circuit in which a proportional speed floating action is produced electrically to vary an output voltage in response to deviations of a condition to be controlled from a desired set point and at a rate proportional to the amount of deviation.

A further object is to provide a control circuit in which the output voltage has added thereto a voltage proportional to the amount of deviation to produce a final output voltage proportional to the amount of deviation and which is changed at a rate proportional to the amount of deviation.

According to a feature of the invention, alternating voltages are employed throughout and provide a time integral function.

The above and other objects and features of the invention will be more readily apparent from the following description when read in connection with the accompanying drawing, in which.

Figure 1:
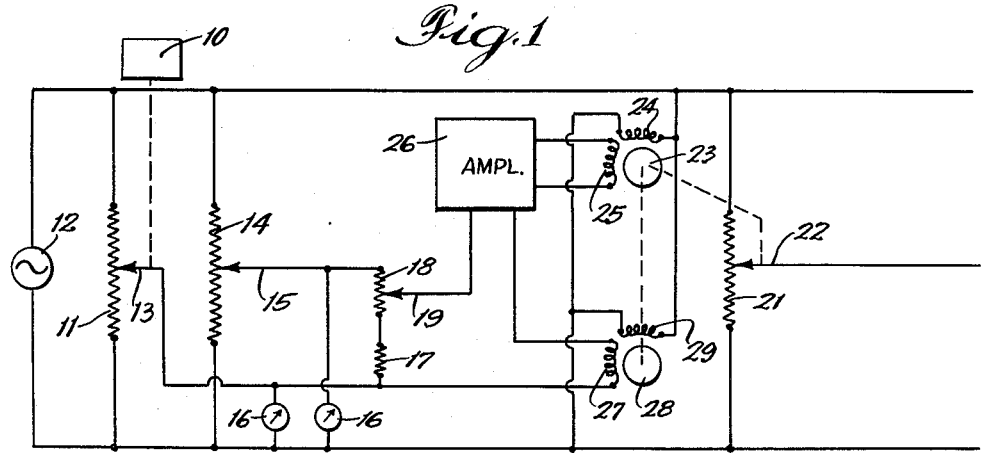
FIGURE 1 is a diagram of a control circuit embodying the invention.

The circuit as shown in FIGURE 1 is adapted to provide a proportional speed floating control in which there is no proportional relationship between the input and output voltages and the output voltage is controlled to return the measured condition to normal through suitable control devices. As shown, the condition to be measured influences a transmitter indicated generally at 10 to adjust a voltage producing device to a position corresponding to the existing value of the condition. As shown, the voltage producing device is a potentiometer including a resistor 11 connected across an A.C. source 12 and having a wiper 13 adjustable therealong. The wiper is connected to the instrument 10 to be moved thereby in response to changes in the condition, so that the voltage at the wiper will be proportional to the existing value of the condition.

A second potentiometer is provided including a resistor 14 having a wiper 15 adjustable therealong to produce a voltage proportional to the desired set point for the condition. The wiper 15 may be adjustable manually to the desired set point or may be continuously adjusted automatically in response to another condition to which the condition being controlled is related. Instruments such as voltmeters 16 may be provided to measure and indicate the voltages corresponding to the condition and to the set point, if desired.

The wipers 13 and 15 are connected through a fixed resistor 17 and a potentiometer resistor 18, along which a wiper 19 is movable. The voltage between the wipers 13 and 15, as impressed across the resistors 17 and 18, is proportional to the deviation of the condition from the set point, and the voltage at the wiper 19 is proportional to the deviation or error E times a constant $K_1$ determined by the adjustment of the wiper 19. This can be expressed mathematically as $K_1E$, where E is the deviation or error of the measured condition from the set point and $K_1$ is the constant determined by adjustment of the wiper 19.

The voltage at the wiper 19 is utilized to control a motor which in turn adjusts a voltage producing device to create an output voltage which can be utilized through correcting devices to correct the condition and bring it back to the set point. As shown, the output voltage is developed by a potentiometer including a resistor 21 having a wiper 22 adjustable therealong with the output voltage being measured between the wiper 22 and one side of the source 12. This voltage can be transmitted to a control device of any desired type which will in turn control valves, speed controllers or other control instrumentalities to change the condition back toward the set point.

The wiper 22 is moved by a two-phase motor 23 having a main winding 24 connected across the source 12 and a control winding 25. The control winding is energized through an amplifier 26, one of whose input terminals is connected directly to the wiper 19, and the other of whose terminals is connected through a generator winding 27 to the wiper 13. The generator includes an armature 28 mechanically connected to the motor 23 to be driven thereby and a field winding 29 connected across the source 12, so that the voltage generated in the winding 27 will be proportional to the speed and direction of the motor.

In operation, when the condition is at the desired value, the voltages at wipers 13 and 15 will be equal and the voltage at the wiper 19 will be zero. At this time the motor 23 is stationary and the wiper 22 is adjusted to the proper position to produce an output voltage O which will maintain the condition at the desired value. Upon a change in the condition, the instrument 10 will move the wiper 13 to create a voltage at the wiper 19, whose amplitude and phase will be proportional to the amount and direction of deviation of the condition from the set point. At this time the motor 23 will run in one direction or the other depending upon the direction of change of the condition to adjust the wiper 22 to increase or decrease the output voltage O. The changed output voltage O will act through the control devices to change the condition in a direction back toward the set point. When the condition is again returned to the set point, the voltages at wipers 13 and 15 will again be equal and the wiper 22 will remain in its then adjusted position.

As the motor 23 turns, it will turn the generator 28 and generate a voltage in the winding 27 which is out of phase with the voltage at the wiper 19 to oppose it. This voltage will be proportional to the speed of the generator and is representative of the rate of change of the output voltage. Mathematically, the voltage O appearing on wiper 22 in the winding 27 can be expressed as $$\frac{dO}{dt}$$

where O is the output voltage appearing at wiper 22. The generator voltage tends at all times to balance the voltage at the wiper 19 and this wiper may be adjusted to set the maximum speed of the motor and the rate of adjustment of the output voltage. Mathematically, this relationship of the generator and wiper voltages can be expressed as:

$$K_1 E = \frac{dO}{dt}$$

or $$O = K_1 \int E\, dt$$

In other words, the output voltage O will be proportional to the adjustment $K_1$ of the wiper 19 times the integral of the error with respect to the time $t$ and will vary at a rate proportional to adjustment of the wiper 19 times the error. The wiper 19 can be adjusted to provide the required degree of stability and to vary the rate at which the output voltage O will be changed for a given amount of error E, so that the rate of correction of the condition is easily adjustable and the desired stability of the circuit is obtained. This results in a proportional speed floating control which is highly desirable for many types of control applications and which is easily obtained with a minimum amount of equipment.

Figure 2:
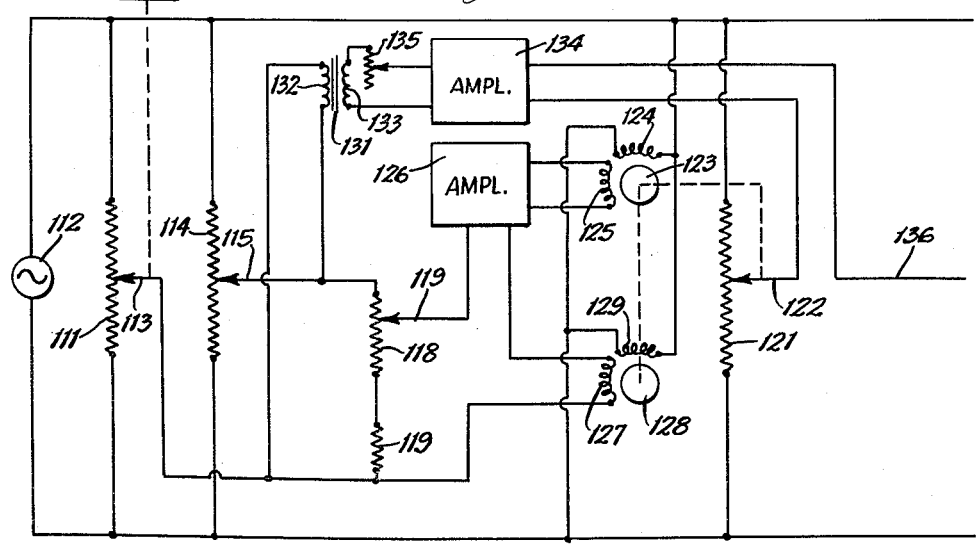
FIGURE 2 is a diagram of an alternative form of circuit.

The circuit of FIGURE 2 is identical to that of FIGURE 1, with the addition of a further factor to produce a proportional position effect, and parts in FIGURE 2 corresponding to like parts in FIGURE 1 are indicated by the same reference numerals plus 100. In this instance the output circuit is connected to the wipers 113 and 115 through isolating means such as a transformer 131 or an amplifier 134 or both. As shown, the transformer 131 has its primary winding 132 connected directly between the wipers 113 and 115. The transformer secondary winding 133 has one side connected to the input of the amplifier 134 and its other side connected through an adjustable potentiometer 135 to the other input terminal of the amplifier. One of the amplifier output terminals is connected to the wiper 122 and the other output terminal is connected to a line 136 in which the final output voltage O′ is developed, so that the amplified secondary voltage of the transformer 131, as multiplied by a factor $K_2$ determined by the adjustment of the potentiometer 135, is added to the voltage at the wiper 122 to produce the final output voltage in the line 136.

In the operation of this system, when a change in the condition occurs, a voltage will be produced at the wiper 122 in the same manner as described above in connection with FIGURE 1, and there will be added to this voltage a second voltage as developed in the transformer 131 and modified by the potentiometer 135 and the amplifier 134 to produce the final output voltage O′. Mathematically, the final output voltage O′ can be expressed as follows:

$$O' = K_1 \int E\, dt + K_2 E$$

The effect of the factor $K_2 E$ can be varied by adjustment of the potentiometer 135 and by the characteristics of the amplifier to determine any desired rate of correction, and could be made greater than the error to produce overshoot for rapid correction. When the condition returns to the set point, $K_2$ will become zero so that the final output voltage O′ at balance will be the same as in the case of FIGURE 1. Inclusion of the $K_2$ factor, however, creates a proportional speed-proportional position control which is more desirable than the control of FIGURE 1 for many types of applications.

While two embodiments of the invention have been shown and described in detail, it will be understood that these are illustrative only and are not to be taken as a definition of the scope of the invention, reference being had for this purpose to the appended claims.

What is claimed is:

1. An electric control circuit comprising means to produce an electrical voltage proportional to departure of a condition from a set point, adjustable means to produce a variable output voltage, a motor responsive to the first-named voltage and mechanically connected to the adjustable means to adjust it, and means to add the first named voltage to the output voltage to produce a final output voltage.

2. An electric control circuit comprising means to produce an electrical voltage proportional to departure of a condition from a set point, adjustable means to produce a variable output voltage, a motor mechanically connected to the adjustable means to adjust it, means responsive to the rate of adjustment of the adjustable means to produce a compensating voltage, means responsive to the difference between the first named voltage and the compensating voltage to control the motor, and means to add the first named voltage to the output voltage to produce a final output voltage.

3. An electric control circuit comprising a pair of voltage producing devices respectively adjusted in accordance with the value of a condition to be controlled and a desired set point for the condition, a circuit connecting said devices in voltage opposition to produce a first control voltage proportional to the departure of the condition from the set point, an adjustable voltage producing device to produce an output voltage, a motor mechanically connected to the adjustable device to adjust it, a generator driven by the motor to produce a voltage proportional to the motor speed, control means for the motor responsive to the difference between the last named voltage and the first control voltage, and means responsive to said first control voltage and to said output voltage to produce a final output voltage proportional to the sum of said first control voltage and said output voltage.

4. An electric control circuit comprising a pair of voltage producing devices respectively adjusted in accordance with the value of a condition to be controlled and a desired set point for the condition, a circuit connecting said devices in voltage opposition to produce a first control voltage proportional to the departure of the condition from the set point, an adjustable voltage producing device to produce an output voltage, a motor mechanically connected to the adjustable device to adjust it, a generator driven by the motor to produce a voltage proportional to the motor speed, control means for the motor responsive to the difference between the last named voltage and the first control voltage, and means to add the first control voltage and the output voltage to produce a final output voltage.

5. An electrical circuit comprising a pair of voltage sources, means responsive to the voltages at said sources for producing a first voltage proportional to the difference between the voltages at said sources, means responsive to the voltages at said sources for producing a second voltage proportional to the time integral of the difference between the voltages at said sources, and means responsive to said first and second voltages for producing a third voltage proportional to the sum of said first and second voltages.

6. An electric control circuit comprising means to produce an electrical voltage proportional to departure of a condition from a set point, a first means to produce a variable output voltage, a second means connected to the first means to vary the output thereof, means responsive to the rate of variation of the first means to produce a compensating voltage, means responsive to the difference between the first named voltage and the compensating voltage to control said second means, and means to add the first named voltage to the output voltage to produce a final output voltage.

7. An electrical circuit comprising a pair of signal sources, means responsive to the signals at said sources for producing a first signal proportional to the difference between the magnitude of the signals at said sources, means responsive to the signals at said sources for producing a second signal proportional to the time integral of the difference between the magnitude of the signals at said sources, and means responsive to said first and second signals for producing a third signal proportional to the sum of said first and second signals.

8. An electrical control circuit comprising means to produce an electrical signal proportional to departure of a condition from a set point, a first means to produce a variable output signal, a second means connected to the first means to vary the output thereof, means responsive to the rate of variation of the first means to produce a compensating signal, means responsive to the difference between the first named signal and the compensating signal to control said second means, and means to add the first named signal to the output signal to produce a final output signal.

9. In a process control circuit, means to control a condition of said process comprising: means for detecting variations in such condition, means controlled by said detecting means to produce a first electrical signal proportional to departure of said condition from a set point, means to produce an electrical output signal, means responsive to said first electrical signal and directly connected to said last mentioned means effective to adjust said output signal in accordance with the time integral of the first electrical signal.

References Cited in the file of this patent

UNITED STATES PATENTS

| | | |
|---|---|---|
| 2,115,086 | Riggs | Apr. 26, 1938 |
| 2,525,967 | Smoot | Oct. 17, 1950 |
| 2,593,950 | Williams | Apr. 22, 1952 |
| 2,612,628 | Hornfeck | Sept. 30, 1952 |
| 2,674,708 | Husted | Apr. 6, 1954 |
| 2,819,437 | White | Jan. 7, 1958 |

OTHER REFERENCES

Electronic Instruments, Greenwood, Holdam, MacRae, McGraw-Hill, New York, 1948, p. 84, FIGS. 4–29; p. 480, Sec. 14–4.

Ahrendt, W. R.: Servomechanism Practice, McGraw-Hill, New York, N.Y., 1954, p. 115, FIGS. 8–1.